United States Patent Office 3,086,356
Patented Apr. 23, 1963

3,086,356
HYPERGOLIC FUEL-OXIDIZER SYSTEM
David J. Craig, Allen Park, Mich., and Walter B. Moen, Berkeley Heights, N.J., assignors to Air Reduction Company, Incorporated, New York, N.Y., a corporation of New York
No Drawing. Filed May 18, 1959, Ser. No. 814,099
15 Claims. (Cl. 60—35.4)

This invention relates to hypergolic fuel-oxidant systems and, more particularly, to such systems that may be advantageously used as rocket propellants.

In its more particular aspects, the present invention is concerned with bipropellant systems for rocket propulsion employing oxygen as the major means for oxidation of the fuel component and has as one of its principal objects the objective of rendering such oxygen-fuel systems substantially instantaneously ignitible or hypergolic.

In connection with the field of propulsion systems, such as rocket devices and systems, the term propellant refers to the fuel-oxidant system which in operation produces a chemical reaction generating high temperature, high pressure combustion products. Such products are ejected through a nozzle and thereby produce a resultant rapid acceleration of the rocket device. Liquid propellants may be classified broadly into two categories, either as (1) a monopropellant, or (2) a bipropellant. Monopropellants constitute materials which combine both a fuel and an oxidant which are normaly stable but may be ignited by subjection to heat and pressure. Thus, a suitable monopropellant may be delivered to the combustion chamber of a rocket device where it may be caused to ignite by suitable heating and pressurizing means to produce a desired thrust by exhaust of the high temperature and pressure combustion products. In contrast, a bipropellant system designates a system wherein the fuel and oxidant components are maintained separate and brought into contact at the time of introduction into the combustion chamber where ignition occurs. The monopropellant system is desirable from a standpoint of simplicity in delivery of the propellant to the combustion chamber and control of operation. However, bipropellant systems offer other advantages and, for certain purposes, are greatly preferred. For example, up to the present time, the bipropellant systems which are known and available afford a much higher performance than the monopropellant systems and are, therefore, preferred in terms of the availability of energy and ability to achieve higher acceleration of a rocket device. There are, however, certain undesirable characteristics of present known bipropellant systems which the industry is diligently seeking to overcome.

One of the disadvantages connected with the use of bipropellant systems involves the occurrence of a delay between the time the separate constituents are introduced into the combustion chamber and the time at which ignition occurs. If such ignition occurs substantially instantaneously, and spontaneously, the bipropellant system is said to be hypergolic. Generally, for purposes of designating hypergolic bipropellant systems suitable for rocket propulsion systems time delays, between introduction of the constituents and ignition, of about 50 milliseconds or less are required. Bipropellant systems having greater time delays generally are not considered hypergolic for purposes of a rocket propulsion system. When such inordinate delay of ignition occurs, it is usually necessary to subject the bipropellant mixture to some form of energy input to produce ignition. This, of course, poses further problems with respect to the control and proper ignition of such a system. Where a considerable delay above 50 milliseconds duration may occur, there is an attendant hazard that the accumulation of the bipropellant mixture in the combustion chamber may reach such proportions that upon subsequent ignition an explosive reaction will be produced that may seriously, if not completely, damage the rocket motor. Accordingly, it is a principal object of the present invention to provide a novel bipropellant system which is consistently and dependably hypergolic.

It is a further object of the present invention to provide a high performance bipropellant system, using oxygen as an oxidizer. Certain bipropellant systems have exhibited hypergolicity. Thus, for example, chlorine trifluoride and nitric acid, as oxidizers, are hypergolic with various fuel components. However, such systems are significantly inferior to many other bipropellant systems as manifested by their substantially lower rocket performance. In addition, such oxidizing elements are either highly toxic or produce highly toxic combustion products and are highly corrosive. Fluorine, also, has been found to be hypergolic with fuels such as hydrogen. Such system, furthermore, is of an extremely high performance. However, fluorine is extremely toxic and corrosive and, in addition, poses extremely difficult problems, due to its cryogenic nature requiring extensive refrigeration such as by cooling with liquid nitrogen, in order to maintain it in a liquid condition. While oxygen also is a cryogenic material and suitable provision must be made to maintain it in the liquid phase, this can be done more readily than with fluorine. Furthermore, oxygen is considerably more desirable and tolerable, due to the absence of high toxicity and corrosive effects. The conventional, high performance oxygen-fuel, bipropellant systems, however, which have been heretofore available are not hypergolic.

In accordance with a still further object of the present invention, a highly desirable fuel-oxidant system is provided which is readily and safely stored prior to use, hypergolic in nature and which possesses a high degree of combustion, uniformity and stability.

In accordance with the present invention, such objectives are achieved by providing an oxygen-fuel bipropellant system wherein the oxygen constituent contains a minor amount of ozone as an additive and the fuel component contains a minor amount of an additive selected from the group comprising lower alkyl, alkenyl and alkynyl substituted acetylene, hydrazine and lower alkyl substituted hydrazines. The fuel and oxidizer components of the bipropellant system are advantageously delivered as liquids for admixture in a suitable combustion chamber and the additives are present in solution in the respective liquid components of the bipropellant.

While varying amounts of ozone may be employed in such a bipropellant system, in accordance with the present invention, it is a particularly advantageous feature of this invention that hypergolic reactivity may be achieved with relatively low concentrations of ozone which are relatively stable and which thereby avoid the hazard of explosive decomposition. Thus, highly advantageous results may be achieved employing concentrations of ozone in oxygen sufficient to produce hypergolicity, of less than 10% by weight of the oxygen component and especially in the range of 5–10% by weight.

The fuel component usable in carrying out the present invention may be any of the generally known and recognized rocket propellant fuels. In particular, petroleum derivatives such as are now widely used are suitable, which include, for example, such fractions as gasoline, kerosene, diesel oil and those fractions frequently identified as turbo-jet fuels. These petroleum fractions are characterized by containing straight chain hydrocarbon components such as heptane, octane, olefins and aromatics, as well as other complex hydrocarbons. Generally, the petroleum fuels form a yellow-white brilliant radiant flame and give excellent performance. They are relatively easy to handle and are particularly desirable in view of their ample supply and availability at low cost. The fuels that are widely designated for jet engines and identified by government specifications, for example, such as JP-4 and JP-3 fuels, which constitute petroleum fractions of a specified boiling point range, are particularly advantageous for use in connection with the present invention. The specifications for fuels, such as those indicated above, including JP-4 and JP-3, need not be described in detail since they are well defined by government specifications and are readily available.

Varying amounts of the fuel additive may be employed so as to render the bipropellant system with the ozone-oxygen additive hypergolic. Generally, for ozone concentrations of 10% or lower, concentrations of the fuel additive of from 5–10% by weight of the fuel component are effective. While higher concentrations of the additive may be utilized, such additional amounts do not afford any particular advantage since these additives normally are appreciably higher in cost than the fuels themselves and also because they usually exhibit a somewhat lower potential energy upon combustion than is available from oxidation of a corresponding amount of the fuel. Consequently, the use of the lower concentrations of the additive which are efficacious for production of hypergolic reaction are most advantageous. The fuel additives, which are effective in accordance with the present invention, are lower alkyl, alkenyl and alkynyl substituted acetylenes which preferably are normally liquid at atmospheric conditions, such as 1-butyne, isopropenyl acetylene and 1,6-heptadiyne, hydrazine and lower alkyl substituted hydrazines such as unsymmetrical dimethyl hydrazine.

The bipropellant systems, in accordance with the present invention, may be effectively utilized in typical rocket devices such as are of well known construction and design. Typical rocket systems are illustrated and described in the text, "Rocket Propulsion Elements," George P. Sutton, published by John Wiley and Sons, 1956. This text is widely recognized as authoritative on the subject of rocket propulsion. A typical rocket device, as schematically illustrated and described on page 10 of this text, for example, includes separate tanks in which the oxidizer and fuel components of the bipropellant system are contained and which have individual feed lines for delivering the respective components into the rocket combustion chamber through separate injector nozzles. Each of the feed lines is equipped with a valve which may be suitably controlled such as by an electrical control circuit to regulate the delivery of the respective components. The fuel and oxidizer are customarily delivered by arranging a pump device in the feed delivery line or alternatively by pressurizing the respective tanks with a suitable gaseous medium that causes the physical displacement of the liquids from the storage tanks into the delivery lines and combustion chamber. In connection with the present bipropellant system, gas pressurizing means have been used advantageously in which high pressure nitrogen of substantially about 200–300 p.s.i. has been introduced into the fuel tank and helium under a pressure of approximately 200–300 p.s.i. has been introduced into the oxidizer tank. The desired proportions of the fuel and the oxidizer are readily achieved by suitable proportioning of the orifices. In utilizing the bipropellant system, according to the present invention, the proportions of the fuel and oxidant components correspond commonly to the conventional mixtures utilized in which the proportion of the fuel is slightly greater than the stoichiometric value so that a slight fuel enrichment is maintained.

Illustrative of the effectiveness of the oxidizer and fuel additives, in accordance with the present invention, to render oxygen-fuel bipropellant systems hypergolic are the results of experiments wherein representative additives were employed. Such tests were carried out by delivering the respective bipropellant components from separate containers to an experimental thrust chamber having the respective injector nozzles arranged to produce impingement of the delivered streams of the constituents in a manner simulating an actual rocket propulsion system such as that generally described above.

The experimental thrust chamber was provided with a transparent wall section through which ignition within the chamber was detectable by a photocell. A piezoelectric pressure transducer was arranged in the fuel delivery line immediately upstream of the fuel injector nozzle to sense the delivery at this point of a pressurized fuel stream. The resulting signal available from the pressure transducer was employed to trigger a cathode ray oscilloscope. The first evolution of light within the combustion chamber detected by the photocell was taken to correspond to ignition of the fuel-oxidant mixture delivered to the chamber and the resulting signal also was fed to the oscilloscope. By establishing the oxidant flow prior to the fuel flow and determining the time interval required for the fuel to pass between the position of the pressure transducer in the fuel line and the point of impingement of the fuel stream with the oxidant stream within the chamber, the ignition delay for the various test mixtures was readily determined by direct measurement of the interval between the pressure transducer response and the photocell response on the oscilloscope signal which was recorded photographically.

The following tabulated data summarize the results of a series of such tests wherein the average observed time delays for ignition and the mean deviations from the average are given for the various runs using various fuel additives:

*Time Delay Intervals JP-4 Fuel*

| Additive | Wt. Percent in JP-4 | Percent Ozone in Oxygen | Ignition Delay, Milliseconds | No. of Tests |
| --- | --- | --- | --- | --- |
| IPA [1] | 10 | 10 | 9.5±4 | 11 |
| IPA | 10 | 5 | 32±6 | 4 |
| IPA | 5 | 5 | 38±9 | 4 |
| IPA | 10 | 10 | 30±1 | 2 |
| IPA | 10 | 5 | 37±9 | 3 |
| | 0 | 10 | No ignition | 3 |
| UDMH [2] | 5 | 5 | 1 | 1 |
| UDMH | 10 | 10 | 0 | 1 |
| UDMH | 10 | 5 | 0±0 | 2 |
| 1,6-heptadiyne | 10 | 10 | 0±0 | 2 |

[1] Isopropenylacetylene.
[2] Unsymmetrical dimethyl hydrazine.

It may be advantageous in carrying out the invention to add to the stored oxygen-ozone liquid mixture a small amount of Freon 13 (a trade name for monochlorotrifluoromethane) which tends to homogenize this liquid mixture and maintain it of substantially uniform concentration over the entire period of depletion thereby affording a constant mixture of ozone-oxygen from the oxidizer storage vessel for admixture with the fuel-additive component. Relatively small concentrations of the Freon 13 in the order of about 3 mol percent of the ozone present are effective for this purpose.

It may be seen, while the hypergolic oxidizer-fuel systems, in accordance with the present invention, have been described particularly with reference to use as rocket propellants, that such oxidizer-fuel system may be applied for various other purposes in which the output of high temperature and/or high velocity gases is desired. Accordingly, the present invention is not limited to the specific embodiments herein described but may be used in other ways without departing from the scope of the invention as defined in the following claims.

We claim:
1. A method of producing a spontaneous, substantially instantaneous combustion reaction between an oxidizer and a fuel comprising separately storing liquid oxygen as said oxidizer containing about 5–10% by weight of ozone and a liquid petroleum fraction as the fuel component containing about 5–10% by weight of an additive selected from the group consisting of lower alkyl, alkenyl, alkynyl substituted acetylene, hydrazine and lower alkyl substituted alkynyl and bringing into contact streams of said liquid components in predetermined, controlled proportions.

2. A method according to claim 1 wherein said fuel additive is isopropenyl acetylene.

3. A method according to claim 1 wherein said fuel additive is 1,6-heptadiyne.

4. A method according to claim 1 wherein said fuel additive is unsymmetrical dimethyl hydrazine.

5. A method according to claim 1 wherein said proportions of said oxidizer and fuel components are substantially about stoichiometric.

6. The method in accordance with claim 1, wherein said stored ozone-oxygen liquid mixture contains a small amount of Freon 13 effective to maintain said liquid mixture substantially uniform.

7. A method for applying immediate thrust to a mass comprising introducing separate streams of an oxidant and fuel component of a bipropellant into contact with each other in a combustion chamber of a reaction motor in proportions effective to produce spontaneous ignition, wherein the proportion of said fuel component to said oxidant is slightly greater than stoichiometric, said oxidant consisting essentially of oxygen and 5–10% by weight ozone and said fuel component consisting essentially of a petroleum fraction and 5–10% by weight of an additive selected from the group consisting of lower alkyl, alkenyl, alkynyl substituted acetylene, hydrazine and lower alkyl substituted hydrazine.

8. An oxidizer-fuel bipropellant system characterized by hypergolicity consisting essentially of oxygen as the oxidizer component containing as an additive from 5–10% by weight of ozone and a petroleum fraction as the fuel component containing as an additive about 5–10% by weight of a material selected from the group consisting of lower alkyl, alkenyl, alkynyl substituted acetylene, hydrazine and lower alkyl substituted hydrazine.

9. An oxygen-fuel bipropellant system according to claim 8 wherein said fuel additive comprises unsymmetrical dimethyl hydrazine.

10. An oxygen-fuel bipropellant system according to claim 8 wherein said fuel additive comprises hydrazine.

11. An oxidizer-fuel bipropellant system according to claim 8 in which the proportion of the fuel component to the oxidizer component is substantially at least about stoichiometric.

12. An oxygen-fuel bipropellant system according to claim 8, wherein said fuel additive comprises isopropenyl acetylene.

13. An oxygen-fuel bipropellant system according to claim 8, wherein said fuel additive comprises 1,6-heptadiyne.

14. An oxygen-fuel bipropellant system according to claim 8, wherein said fuel additive comprises a lower alkyl substituted hydrazine.

15. An oxidizer-fuel bipropellant system characterized by hypergolicity consisting of oxygen containing 5–10% by weight of ozone as the oxidizer component and a petroleum fraction containing about 5–10% by weight of a material selected from the group consisting of lower alkyl, alkenyl, alkynyl substituted acetylene, hydrazine and lower alkyl substituted hydrazine as the fuel component.

References Cited in the file of this patent

UNITED STATES PATENTS

| | | |
|---|---|---|
| 2,690,386 | Hager et al. | Sept. 28, 1954 |
| 2,712,496 | Skolnik et al. | July 5, 1955 |
| 2,813,013 | Happel et al. | Nov. 12, 1957 |
| 2,859,833 | Nelson | Nov. 11, 1958 |
| 2,901,886 | Doerner | Sept. 1, 1959 |
| 2,926,750 | Nelson | Mar. 1, 1960 |

OTHER REFERENCES

Leonard: Journal of the American Rocket Society, No. 72, Dec. 1947, pp. 17–21.

Roth et al.: Jet Propulsion, vol. 27 (1957), pp. 1006–11 (note p. 1007).

American Rocket Society Journal, March 1949, page 38.

Lee: Astronautics, Nov. 1958, pp. 50, 51.

Chem. and Eng. News, May 27, 1957, pp. 18–23.

Aero Digest, vol. 63, No. 4, Oct. 1951, p. 54.